April 8, 1969

P. P. LEE 3,437,332

COMPOUND RESILIENT SHOCK ABSORBER

Filed March 29, 1968

INVENTOR
PATRICK P. LEE

BY *Christel & Bean*

ATTORNEYS

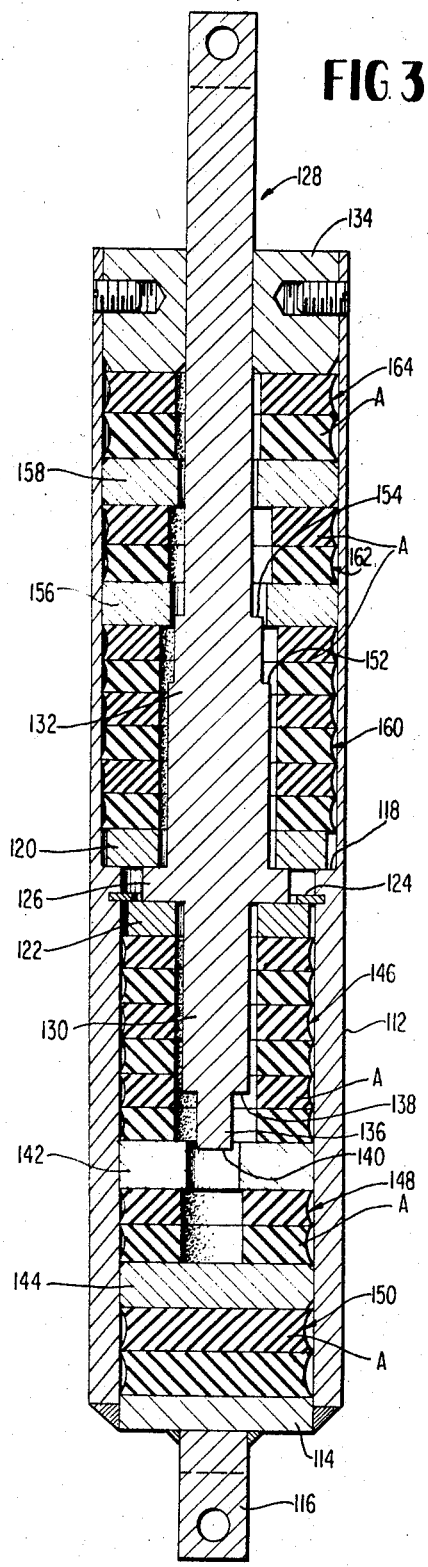

United States Patent Office 3,437,332
Patented Apr. 8, 1969

3,437,332
COMPOUND RESILIENT SHOCK ABSORBER
Patrick P. Lee, Tonawanda, N.Y., assignor to Destech Labs, Inc., Buffalo, N.Y.
Continuation-in-part of application Ser. No. 497,873, Oct. 19, 1965. This application Mar. 29, 1968, Ser. No. 717,095
Int. Cl. F16f 1/44; B60g 11/32
U.S. Cl. 267—1                14 Claims

ABSTRACT OF THE DISCLOSURE

A movable plunger having an extension adapted to terminate compression of one resilient shock absorbing member upon engagement of the extension with a movable abutment plate and thereafter compress a further resilient shock absorber member through movement of the abutment plate in unison with the plunger.

This application is a continuation-in-part of my co-pending application Ser. No. 497,873 filed Oct. 19, 1965, entitled Shock Absorber, now Patent No. 3,376,031.

Background of the invention

The shock absorber disclosed in my above-entitled co-pending application involves the utilization of a resilient shock absorbing element which may be constructed of polyurethane or other resilient solids such as rubber, Viton, nylon and polystyrene and in which the element is of discoidal form having a concave parabolic circumferential side surface and slidably received within a casing, making contact therewith initially along circumferentially extending lines. As the element is compressed the end faces are squeezed together progressively bulging out the concave side.

Brief summary of the invention

The present invention is directed to a compound action shock absorber wherein at least two compressible resilient shock absorber members are adapted to be compressed in progressive fashion. That is to say, one of the shock absorber members is operated upon to a predetermined compressed condition whereafter it is prevented from further compression and further shock absorbing action is directed solely to compression of another shock absorbing member. In this fashion a variable damping rate may be achieved by constructing the different shock absorbing members to possess different rates of resistance to compression thereof.

More particularly, the present invention involves the combination of a casing having an end wall and provided with a slidable plunger normally spaced from the end wall and further provided with an abutment plate between the plunger and the end wall and slidably disposed within the casing. A first resilient shock absorber of one shock absorbing characteristic is disposed between the plunger and the abutment plate and a second resilient shock absorber of a different shock absorbing characteristic is disposed between the abutment plate and the end wall. The plunger carries an extension having a bearing face spaced from the abutment plate to limit the degree of compression of the first shock absorber and thereafter limit further shock absorbing action solely to compression of the second shock absorber.

Brief description of the figures of the drawings

FIG. 3 is a longitudinal section taken through a modified form of shock absorber operable both in tension and compression; and FIG. 4 is a longitudinal section taken through a modified form of shock absorber operable in tension.

Detailed description of the invention

Figure 1:
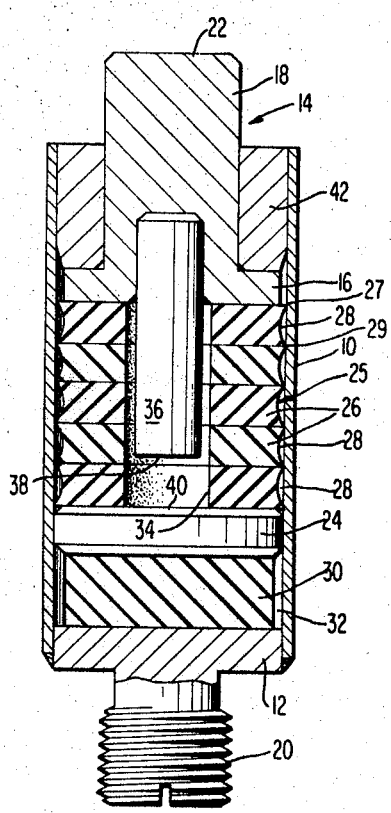
FIG. 1 is a longitudinal section taken through one form of shock absorber according to the present invention, some of the parts being illustrated in elevation.

With reference to FIG. 1, the shock absorber according to the present invention includes a casing 10 which may be of circular cross section and which is provided with an end wall 12 immovably positioned with respect to the side wall of the casing 10. A plunger assembly indicated generally by the reference character 14 includes an enlarged head portion 16 slidably received within the casing 10 and a stem portion 18 which projects axially outwardly through the open end of the casing, substantially as shown. The casing assembly may be fixed to one of two relatively movable parts, not shown, by means of a threaded portion 20 on wall 12 and the outer end face 22 of the plunger stem 18 is adapted to be engaged by the other of the relatively movable parts so that when such parts move relatively toward each other, the plunger assembly 14 is moved within casing 10 toward the end wall 12 thereof.

Also slidably disposed within casing 10 is an abutment plate 24. A first resilient shock absorber 26 is disposed between the abutment plate 24 and the opposing face of the enlarged head 16 of the plunger assembly. The shock absorber column 25 is constructed according to the disclosure of my above-entitled copending application and may consist of a series of stacked disks 26 each of which has a concave circumferential side surface as indicated by the reference character 28. While a simple arcuate form is given to surfaces 28 in the drawing that has been done for ease of illustration only, it being understood that the side surfaces 28 are defined in axial cross section by a parabolic curve drawn about a diametral axis as set forth in my aforesaid application.

Each disk element when uncompressed contacts the inner wall of the casing 10 only along its end edges 27, 29, providing substantially only line contact therewith. The line surface engagement stabilizes the column against lateral collapse during deformation, with very low sliding friction, the bearing surfaces of adjacent disks being in direct abutting engagement whereby the energy absorbing material of the disk elements is continuous throughout the column, as described in my aforesaid application. While five elements 26 are shown in the shock absorbing column of FIG. 1, it can consist of one or any desired number of elements. The member 25 may, as is disclosed in my copending application, be formed from disk elements of various resilient or elastomeric materials and it is chosen so as to display one kind of shock absorbing characteristic or rate. For example, the material may be made more or less dense to impart a stronger or weaker shock absorbing action thereto. Also, the disk elements can be arranged to provide succeeding disks along the column from head 16 with side wall surfaces 28 of progressively decreasing curvature.

A second shock absorbing member 30 is disposed between the abutment plate 24 and end wall 12 and this member is chosen to possess a stiffer shock absorbing characteristic than the first member 25. Thus, when the parts are initially in the position of FIG. 1, and the plunger 14 is moved toward end wall 12, relatively little compression will be imparted to member 30 whereas relatively greater compression will be imparted to the member 25. The member 30 may take the form simply of a disk of rubber which is somewhat smaller than the internal diameter of the casing 10 so as to provide clearance space 32 therearound to allow for a limited degree of compression thereof.

The shock absorbing column 25 is provided with an axially extending central opening 34 and plunger 14 is provided with an axial extension 36 projecting within this opening 34, the extension 36 being provided with a bearing face 38 normally spaced from the opposed face 40 of abutment plate 24 by an amount to allow a predetermined compression of the shock absorbing column 25. Thus, as the plunger is moved, the initial shock absorbing action is confined essentially to compression of column 25 until bearing face 38 engages surface 40 and thus terminates compression of column 25 so that further shock absorbing action is confined to compression of member 30. Since the two members 25 and 30 have different shock absorbing characteristics, the resultant action of the above described shock absorber is to provide a variable damping rate.

The plunger may be retained within the casing 10 by means of a removable plug member 42 and the disposition of the plug may be such as to impart a preload particularly on the shock absorbing column 25.

Figure 2:
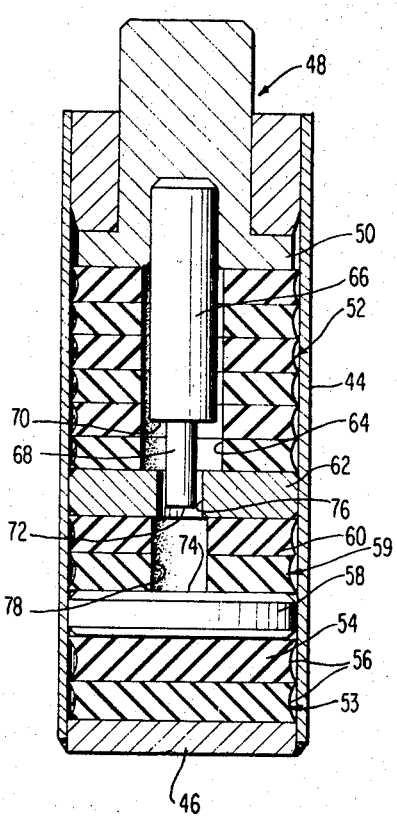
FIG. 2 is a longitudinal section taken through another form of the invention.

In the embodiment according to FIG. 2, the casing is indicated by the reference character 44 and is provided with an end wall 46, the plunger assembly 48 being slidably received within casing 44 and having an enlarged head portion 50. The first shock absorbing column 52 can be identical with shock absorbing column 25 previously described, and the end shock absorbing member 53 can correspond to the shock absorbing member 30 of FIG. 1. However, in FIG. 2 shock absorbing member 53 is shown as consisting of a column of directly abutting disk elements 54 of the type described in my aforesaid copending application, the elements possessing an initially concave, parabolic marginal side surface 56. Likewise, abutment plate 58 which, with end wall 46, sandwiches the shock absorbing column 53 therebetween corresponds to abutment plate 24 in FIG. 1. However, in FIG. 2, there is an additional shock absorbing column 59 and an additional abutment plate 62, the additional column 59 being sandwiched between the two abutment plates 58 and 62 substantially as shown. Column 59 also comprises a pair of directly abutting disk elements 60 as previously described.

As before, the first shock absorbing column 52 is provided with a centrally disposed axial opening 64 and the plunger is provided with an extension 66 projecting within this opening. The extension 66 is provided with a reduced end portion 68 presenting two bearing surfaces 70 and 72. The first bearing face 70 normally is spaced from abutment plate 62 by an amount establishing the maximum compression for shock absorbing column 52. The other bearing face 72 normally is spaced from the opposing surface 74 of abutment plate 58 by an amount which will limit the maximum compressive effect imparted to shock absorbing column 59. Abutment plate 62 is provided with an opening 76 smaller than opening 64 and plunger extension 66 and shock absorbing column 59 is provided with a central opening 78 to allow the reduced end portion 68 of plunger extension 66 ultimately to engage the surface 74 of abutment plate 58.

The shock absorbing columns 52, 53 and 59 all have different shock absorbing characteristics so that a multiple shock absorbing rate is achieved progressively passing through increasingly stiffer stages. The elements thereof can be of progressively decreasing curvature as previously described.

The shock absorber elements and the column arrangement thereof is as set forth in my aforesaid application. Obviously, columns 53 and 59 can consist of a greater or a lesser number of disk elements, and absorber 30 also can consist of one or more of such disk elements having line contact with the casing.

The embodiment of FIG. 4 includes the casing 80 having the end wall 82 immovably positioned with respect to the side wall of the casing 80, the end wall 82 being provided with an ear 84 having an opening 86 to receive a fastener by means of which one end of the assembly may be mounted to one of a pair of relatively movable members. The opposite end of the casing is provided with a removable end wall 88 held in place by suitable fasteners 90. The plunger assembly 92 includes the enlarged head portion 94 and a pair of abutment plates 94 and 96 are slidably received within the casing 80 between the head portion 94 and the end wall 88. Between the head portion 94 and the abutment plate 94 the shock absorber column 98 is disposed, a shock absorber column 100 is disposed between the two abutment plates 94 and 96, and a further shock absorber column 102 is disposed between the abutment plate 96 and the end wall 88.

The axial extension of the plunger assembly 92 projects through the end wall 88 and is provided at its outer end 104 with an opening 106 for receiving a fastener by means of which the shock absorber may be secured to the other of the aforesaid pair of relatively movable members. The axial extension of the plunger assembly is progressively reduced in diameter to present the annular bearing faces 108 and 110 adapted to bottom progressively against the respective abutment plates 94 and 96. Thus, compression of the column 98 is first terminated whereafter compression of the column 100 is next terminated, leaving the column 102 to be last compressed. The construction and characteristics of the columns 98, 100 and 102 may be in accord with the construction and characteristics of the columns and/or members described above in conjunction with FIGS. 1 and 2.

It will be appreciated that the shock absorber of FIGS. 1 and 2 operates in compression whereas the shock absorber of FIG. 4 operates in tension. The modification of FIG. 3 operates both in tension and compression.

In FIG. 3, the casing 112 is provided with an immovable end wall 114 having the attachment ear 116 and the inner surface of the casing is defined by concentric bores of different diameters which, at their intersection, present the stop shoulder 118 serving to seat the plunger plate 120. A further plunger plate 122 is seated against the stop ring 124 in spaced relation to the plunger plate 120. Disposed between these two plates is the enlarged head portion 126 of the plunger assembly 128 which also includes the oppositely projecting axial extensions 130 and 132, the latter of which projects through the removable end wall 134 for attachment to one of the relatively movable parts between which the shock absorbing actions are to be effected.

The axial extension 130 is of reduced diameter in the portion 136 thereof presenting the annular bearing face 138 and the end bearing face 140 cooperable respectively with the abutment plates 142 and 144 when the shock absorber operates in compression. The shock absorber column 146 is disposed between the plunger plate 122 and the abutment plate 142, the shock absorber column 148 is disposed between the abutment plates 142 and 144, and the shock absorber column 150 is disposed between the abutment plate 144 and the end wall 114. In compression, then, the columns 146, 148 and 150 are compressed.

In tension, the progressively reduced portions of the axial extension 132 presenting the annular bearing faces 152 and 154 cooperate with the abutment plates 156 and 158 to compress the shock absorbing columns 160, 162 and 164.

It will be understood, of course, that the principles of operation outlined in connection with FIGS. 1 and 2 apply as well to FIGS. 3 and 4. The individual disks A of FIGS. 3 and 4 correspond to the elements 26 of FIG. 1 but it will be appreciated that single shock absorbing members such as the member 30 of FIG. 1 may be used when desired.

While disk elements of circular configuration corresponding to that of the casing are shown in the drawing, other casing and element configurations can be used.

What is claimed is:
1. A shock absorber assembly comprising, in combination, a casing having an end wall,
a plunger slidably received in said casing,
an abutment plate slidably received in said casing between said plunger and said end wall,
a first resilient shock absorber disposed between said plunger and said abutment plate,
a second resilient shock absorber disposed between said abutment plate and said end wall,
said first shock absorber having an axial opening therethrough and said plunger having an extension projecting within said axial opening, said extension having a bearing face normally spaced from said abutment plate to limit the degree of compression which may be imparted to said first shock absorber as said plunger is moved toward said end wall and thereafter confine further shock absorbing action to compression of said second shock absorber.

2. The shock absorber assembly as defined in claim 1 wherein said first resilient shock absorber is in the form of a plurality of disks stacked between said abutment plate and said plunger, each disk having a concave side wall prior to compression thereof and providing line contact with the interior of said casing.

3. The shock absorber assembly as defined in claim 1 wherein said first resilient shock absorber is in the form of a column of resilient shock absorber disks disposed between and in bearing engagement with said plunger and said abutment plate, each of said disks having parallel upper and lower planar bearing surfaces joined by a concavely recessed peripheral side surface, said side surfaces being parabolic in axial cross-section about an axis equidistant from each of said bearing surfaces.

4. The shock absorber assembly as defined in claim 3 wherein each said disk prior to being subjected to shock absorbing elastic deformation is in engagement with the bore of said casing along a pair of line surfaces defined by said bearing surfaces and said recessed peripheral side surface.

5. The shock absorber assembly according to claim 4 wherein said second shock absorber comprises a resilient shock absorber disk having parallel upper and lower bearing surfaces joined by a flat circumferential side surface, said flat side surface being spaced inwardly from the bore of said casing.

6. The shock absorber assembly according to claim 4 wherein said second shock absorber comprises a column of resilient shock absorber disks each having parallel upper and lower planer bearing surfaces joined by a concavely recessed peripheral side surface, said side surfaces being parabolic in axial cross-section about an axis equidistant from each of said bearing surfaces, each of said second shock absorber disks prior to shock absorbing deformation having sliding engagement with the bore of said casing substantially only along a pair of line surfaces defined by said bearing surfaces and said peripheral side surface.

7. The shock absorber assembly according to claim 1, together with another abutment plate slidably received in said casing between said second shock absorber and said end wall, and a third resilient shock absorber disposed between said other abutment plate and said end wall, said first-mentioned abutment plate and said second shock absorber having an axial opening therethrough, and said plunger extension having an end portion projecting in said last-named opening and providing a second bearing face normally spaced from said other abutment plate a distance greater than the normal spacing of said first-mentioned bearing face from said first-mentioned abutment plate, said second bearing face engaging said other abutment plate as said plunger is moved toward said end wall to limit the degree of compression imparted to said second shock absorber and thereafter confine further shock absorbing action to compression of said third shock absorber.

8. The shock absorber of claim 7, wherein said first and second shock absorbers each comprise a disk having parallel upper and lower bearing surfaces joined by a concavely recessed peripheral side surface of parabolic axial cross-section.

9. The shock absorber of claim 7, wherein said first and third shock absorbers each comprise a disk having parallel upper and lower bearing surfaces joined by a concavely recessed peripheral side surface of parabolic axial cross-section.

10. The shock absorber of claim 7, wherein each of said shock absorbers comprises a column of disks having planar bearing surfaces joined by a concavely recessed peripheral side surface, said side surfaces being parabolic about an axis equidistant from said bearing surfaces in axial cross-section and said disks engaging the bore of said casing substantially only along a pair of line surfaces defined by said bearing surfaces and said recessed side surfaces prior to deformation, said bearing surfaces of adjacent disks being in direct abutting engagement whereby the energy absorbing material of said disks is continuous throughout each of said columns.

11. The shock absorber of claim 1 wherein said axial extension of the plunger extends through said end wall for attachment at its outer end to a member.

12. The shock absorber of claim 1 wherein said plunger is provided with a second axial extension projecting oppositely from the first mentioned axial extension, said casing having an opposite end wall and said second axial extension projecting therethrough and provided adjacent its end with means to associated member, shock absorber means disposed between said plunger and the last mentioned end wall whereby the shock absorber assembly operates in tension and compression.

13. The shock absorber of claim 12 wherein said casing is provided with a stepped inner surface presenting a seat, a first plunger plate normally engaged on said seat, stop means spaced from said seat and a second plunger plate normally engaged against said stop means in spaced parallelism with the first plunger plate, said plunger having an enlarged head portion disposed between said plunger plates.

14. The shock absorber of claim 13 wherein said first axial extension projects through said second plunger plate and said second axial extension projects through said first plunger plate.

References Cited

UNITED STATES PATENTS 2,660,423  11/1953  Roy.
2,987,291  6/1961  Dyson.

DUANE A. REGER, *Primary Examiner.*

U.S. Cl. X.R.
188—1; 267—22